Feb. 13, 1968

H. A. LOZEAU 3,369,165

METHOD AND MEANS FOR CHARGING ELECTRICAL STORAGE BATTERY

Filed March 29, 1965

Inventor
Homer A. Lozeau by
Attorney

United States Patent Office 3,369,165
Patented Feb. 13, 1968

3,369,165
METHOD AND MEANS FOR CHARGING ELECTRICAL STORAGE BATTERY
Homer A. Lozeau, Worcester, Mass., assignor to Koehler Manufacturing Company, Marlboro, Mass., a corporation of Massachusetts
Filed Mar. 29, 1965, Ser. No. 443,315
7 Claims. (Cl. 320—24)

ABSTRACT OF THE DISCLOSURE

A charging circuit including a voltage source, a power transistor and a second transistor connected to the power transistor has a battery on charge arranged to power the transistors whereby the circuit is rendered inoperative when the battery member is disconnected. A variable resistor connected between the battery and the second transistor controls current flow. A diode member connected to the battery cooperates with a third transistor and the said power and second transistor to regulate rate of flow of current through the said battery.

---

This invention relates to an improved electrical circuit useful especially in charging a battery and, more particularly, the invention is concerned with an automatic transistor controlled battery charging circuit which is suitable for use in charging any type of battery including dry cells, lead-acid, and nickel-cadmium cells.

It has been proposed to employ transistorized battery charging circuits which operate on the basis of providing a constant high rate of charge until a battery is practically charged and then a low rate goes into effect as charging terminates. In such a charging operation it will be apparent a relatively high charging rate is maintained to a point very near the end of charge. As a result there is a strong tendency for excessive gassing to occur along with evaporation of water. Moreover as a battery ages, its voltage will not rise sufficiently on charge to trip down to a low rate, and it may remain on a high rate and seriously damage or destroy the battery if left unattended. Finally, a high charging rate if maintained will cause the battery temperature to rise excessively.

It is therefore a general object of the invention to devise an improved method and means for charging batteries whereby the difficulties indicated may be avoided.

It is a further object of the invention to devise an improved battery charging controlled circuit which will provide for limiting the battery voltage while on charge and furnishing a controlled charging current to the battery. It is also an object to maintain the battery voltage while on charge to a substantially fixed potential independently of variations in line voltage whereby a high charging rate may be positively avoided while approaching the end of the charging interval.

Another object of the invention is to provide a charging circuit arrangement which cannot be damaged by faulty connection, accidental over-loading, or other misuse.

Still another specific object is to provide a protectively arranged transistor circuit in which the maximum charging rate for a discharged battery can be set by the value of one resistor and the maximum voltage of the battery on charge can be set by the value of another resistor.

Figure 1:
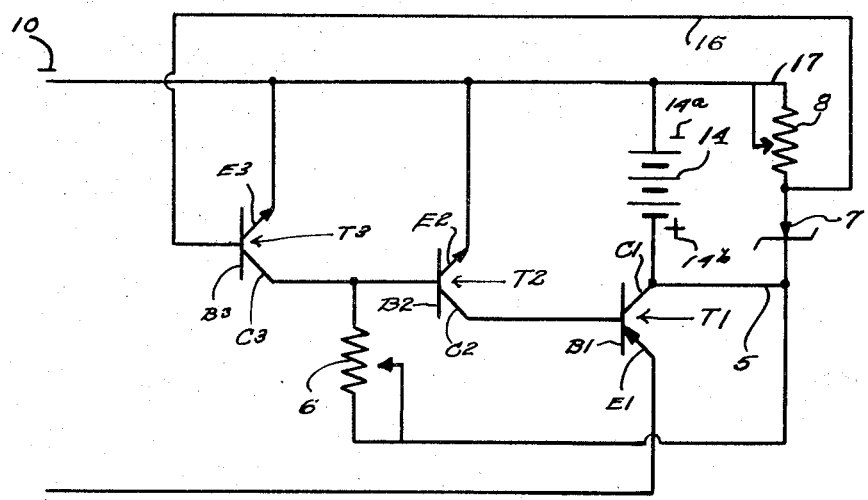
Figure 2:
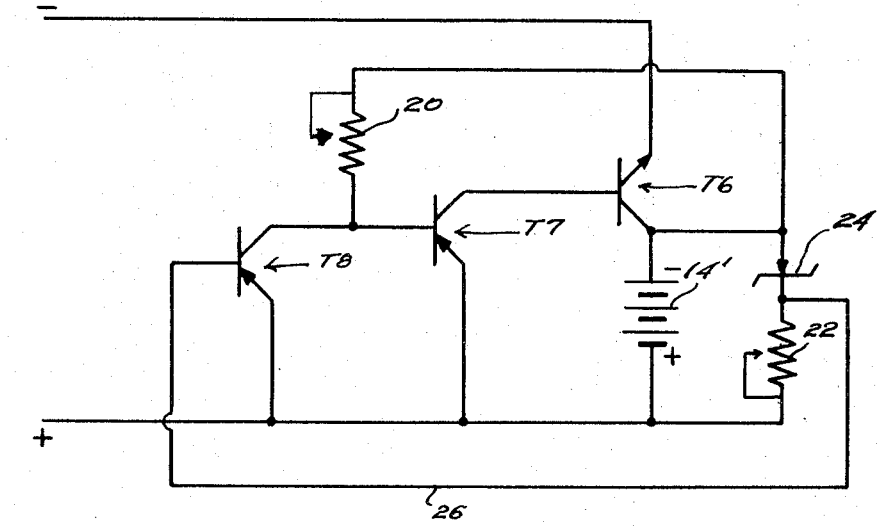

The nature of the invention and its other objects and novel features will be more fully understood and appreciated from the following description of preferred embodiments shown in the accompanying drawings, in which:

FIGURE 1 is a diagrammatic view showing one desirable form of battery charging circuit of the invention; and FIGURE 2 shows an alternate form of a battery charging circuit.

The control method of the invention is based essentially on the concept that a normally discharged battery of the lead-acid type can begin charging at a high rate of current much in excess of the so-called normal charging rate without overheating or excessive gassing or evaporation of water providing the rate is gradually reduced in a suitable manner as charging progresses. The improved charging circuit of the invention embodies this concept by utilizing a pluraltiy of transistors coupled together and combined with a zener diode and a pair of resistors in a specifically related manner.

In beginning a battery charging operation at a relatively high rate it should be understood that the actual rate in amperes should nevertheless be kept below a value equal to the number of ampere hours still out of the battery to prevent excessive gassing and high temperature. For example, a discharged 10 ampere hour battery can start charging at 9 amperes and by the time 9 ampere hours have been replaced (with one ampere hour of charge remaining), the charging rate should be less than one ampere and progressively less thereafter as the battery finishes charging. The battery charger circuit of the invention is designed to meet these conditions as well as others.

If enough time is available for charging, such as batteries used on stand-by service, for example emergency lighting, the charger voltage can be lowered to 2.2 volts per cell and if the battery is discharged, it will start charging at a high rate and gradually lower until the battery is floating at a true trickle charge rate of a few milliamps which is just enough to replace the self discharge of the battery. It will be observed that control in this way can only be realized with a charging circuit such as that hereinafter disclosed and which will hold said voltage regardless of large line voltage variations.

Considering the improved electrical circuit of the invention in greater detail and the particular form of charging circuit illustrated in FIGURE 1, there is provided a line voltage source having a negative side 10 and a positive side 12, and a second voltage source consisting of a battery 14 which is to be charged in accordance with the invention. Connected to the line voltage source is a PNP transistor T1 which is arranged to carry a charging current for the battery 14 when suitably energized. The positive terminal of battery 14 is denoted by numeral 14b and the negative terminal by numeral 14a.

I also provide a second NPN transistor T2 which is connected to the base of transistor T1 in a manner hereinafter described so as to make transistor T1 conduct a current under certain conditions. I further provide a third NPN transistor T3 which is connected to the base of transistor T2, and which is so arranged that it may control both transistors T1 and T2 to prevent them from conducting in a predetermined controlled manner.

Considering in further detail the manner in which control is accomplished, the transistor T1 includes a base element B1 and emitter element E1 and a collector C1. Similarly, B2, E2 and C2 are base, emitter and collector elements respectively of transistor T2; and B3, E3 and C3 are base, emitter and collector elements of transistor T3.

In accordance with the invention the positive terminal 14b of battery 14 is connected through a variable resistor 6 to the base B2 of transistor T2. The variable resistor 6 is used to control operation of transistor T2 and provides a means of varying the voltage source so as to regulate current flow between base B2 and emitter E2 of transistor T2, which allows a regulated current to flow from emitter E2 to collector C2. The collector C2 of transistor T2 is connected to the base B1 of transistor T1 as shown in FIGURE 1 and therefore current flows from B1 to E1 of transistor T1 and this in turn provides for a large current flow between E1 and C1 of transistor T1.

The emitter E2 of transistor T2 is connected to the negative terminal 10 of the line voltage source. I also provide in the circuit shown in FIGURE 1 a semiconductor element consisting of a zener diode indicated at 7. The zener diode is connected to the negative terminal 14a of battery 14, and also connected between the zener diode 7 and terminal 14a is a variable resistor 8. A connector 16 extends between the zener diode 7 and the base B3 of transistor T3. The emitter E3 of transistor T3 is connected to the negative side 10 of the line voltage source and emitter E2 is similarly connected to the negative side of the line voltage source in parallel with emitter E3.

It will be observed that by means of the arrangement of transistors described and in the specific coupled relationship shown and further combined with the zener diode and the two variable resistors, the maximum charging rate of the battery 14 may be set by the value of the resistor 6. Similarly, the maximum voltage of the battery while on charge may be set by the value chosen for the other variable resistor 8. It is pointed out that the variable resistor 6 constitutes a means of controlling operation of transistor T2 and thus functions as a means of varying charging rate since it provides for regulating current flow.

In operation with the battery 14 connected into the circuit as described, current is caused to flow between base element B2 and emitter E2 of transistor T2 and current will also flow from emitter E2 and to collector C2 and then to base element B1 and emitter E1 of transistor T1. This will in turn cause a relatively large current to flow between emitter E1 and collector C1 of transistor T1 to thereby charge the battery 14. During this time the NPN transistor T3 cannot conduct as there is no current flow between E3 and B3.

As the battery charging operation proceeds at a rate determined by the setting of the variable resistor 6, the voltage of the battery gradually rises until it exceeds a predetermined break-down voltage of the zener diode 7 and there will then occur a voltage across variable resistor 8. This voltage is applied immediately through connectors 16 and 17 to base B3 and emitter E3 respectively of transistor T3, which provides for current flow between F3 and B3 and this in turn causes the path between E3 and C3 to conduct.

However, since emitter E3 and collector C3 of transistor T3 are connected in parallel with base B2 and emitter E2 of transistor T2, the current between B2 and E2 of transistor T2 will be partially shunted out and therefore E2 and C2 of transistor T2 will conduct less and in turn B1 and E1 of transistor T1 will have less current flow thereby reducing the charging current from E1 and C1 of T1.

This process of reducing the charging current through E1 and C1 of transistor T1 will continue until just enough current flows to maintain the required battery voltage. Thus it will be apparent that the maximum charging rate can be set by the value chosen for the resistor 6 and the maximum voltage of the battery on charge can be set by the value chosen of the resistor 8.

As noted above, the emitter E2 of transistor T2 is connected to the negative side 14a of the battery 14 while on charge and the base B2 of transistor T2 is connected to the positive side 14b of the battery 14. Therefore, if the battery is removed inadvertently transistor T2 has no source of input voltage and therefore cannot conduct. This condition also prevents transistor T1 from conducting. Therefore, a desirable short circuit protection is realized.

It is also pointed out that in the event the battery 14 is wrongly connected to the charging circuit with the polarity reversed, the wrong polarity will appear across the base B2 and emitter E2 of transistor T2 preventing it from conducting and no operation will occur.

Still further it should be observed that where there is a requirement for voltage being varied with a change in temperature, the circuit of the invention conveniently provides this control by lowering voltage as temperature rises. This may be readily carried out automatically by replacing resistor 8 in the circuit above described with a PTC (positive temperature coefficient) resistor of a properly chosen value.

In FIGURE 2 a circuit diagram similar to that shown in FIGURE 1 is provided in which the power transistor is a NPN junction transistor and two PNP transistors are employed with this power transistor. The power transistor is denoted by the reference T6 and the other two transistors are denoted by the references T7 and T8. With this arrangement of transistors is employed resistors 20 and 22 which operate to regulate charging rate and maximum voltage in much the same way as resistors 6 and 8 above described. Also a zener diode 24 is connected through connector 26 to the base of transistor T8. It will be understood that this circuit operates in the same manner as that of FIGURE 1 and provides the same functioning and features set forth.

While I have shown preferred embodiments of the invention, it should be understood that various other applications of the electrical circuit of the invention may be carried out and the charging operation may take various other forms, and various changes and modifications may be resorted to within the scope of the appended claims.

I claim:

1. An electrical charging circuit comprising a voltage source, a power transistor connected to the voltage source, a second transistor connected to the power transistor at the base thereof, a second voltage source comprising a battery on charge, said battery being arranged to receive current flow from the power transistor and vary in voltage value, the positive terminal of said second voltage source battery being connected to the base of the said second transistor to power the second transistor and the power transistor, whereby the circuit is rendered inoperative when the battery is disconnected, and a variable resistor between said second voltage source and said second transistor base to control current flow therethrough, a diode member connected to said second voltage source to provide a path which normally prevents a flow of current, a third transistor connected to the said second transistor and to the said second voltage source through said diode member, a variable resistor located between the said second voltage source and the diode member and connected to the base of the said third transistor to cause a current to flow therein when current flows across the diode member in response to a rise in voltage in the said second voltage source whereby the rate of flow of current through the said second voltage source is regulated.

2. An electrical charging circuit arrangement comprising a voltage source and a power transistor connected at one side of the said voltage source, a second voltage source consisting of a storage battery on charge connected to an opposite side of the said power transistor to provide for current flow therebetween, a second transistor having one side connected to the base of the said power transistor and another side connected to the positive terminal of said battery, said battery functioning to power the second transistor and to render the electrical circuit inoperative when the battery is disconnected, a connector extending between one battery terminal and the base of the said second transistor and having variable resistor means included therein for selectively controlling the flow of current in the said second transistor and first transistor, a diode member connected at one side of said battery to provide a path which normally prevents flow of current, a third transistor connected to the battery through said diode member, a variable resistor located between the diode and said battery and connected to the base of the third transistor to provide for flow of current in third transistor when a flow of current occurs through the diode in response to increase in voltage in the battery.

3. A circuit according to claim 2 in which the power transistor is a PNP type junction transistor and the said second and third transistors are NPN type junction transistors.

4. A circuit according to claim 2 in which the power transistor is a NPN type junction transistor and the second and third transistors are PNP type junction transistors.

5. A structure according to claim 2 in which the diode is a zener diode.

6. A charging circuit according to claim 2 in which the resistor means includes a positive temperature coefficient resistor for lowering voltage as temperature of the battery rises.

7. A charging circuit according to claim 2 in which the battery on charge has its negative side connected to the negative side of said first voltage source and said transistor means being connected between the positive side of the battery on charge and the positive terminal of the said first voltage source and said resistor and diode being connected between the negative terminal of the said first voltage source and the said battery.

References Cited

UNITED STATES PATENTS

| | | | |
|---|---|---|---|
| 3,109,981 | 11/1963 | Muchnick | 323—22 |
| 3,117,269 | 1/1964 | Pensak | 320—40 |
| 3,123,759 | 3/1964 | Grey | 320—40 |
| 3,226,623 | 12/1965 | Krueger et al. | 320—43 |
| 3,281,639 | 10/1966 | Potter et al. | 320—39 X |

JOHN F. COUCH, *Primary Examiner.*

S. WEINBERG, *Assistant Examiner.*